(No Model.) 2 Sheets—Sheet 1.
D. KAHNWEILER.
COTTON SEED HULLING MACHINE.
No. 294,241. Patented Feb. 26, 1884.
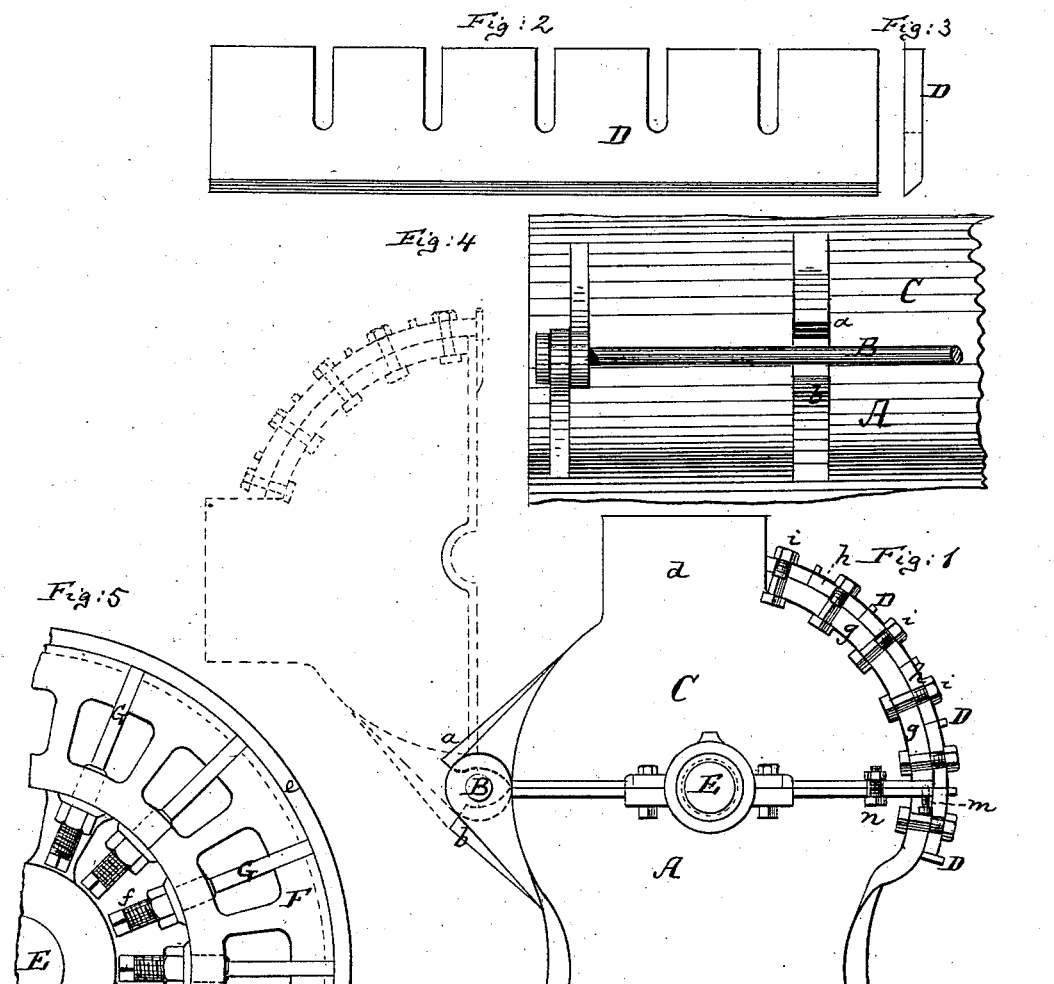

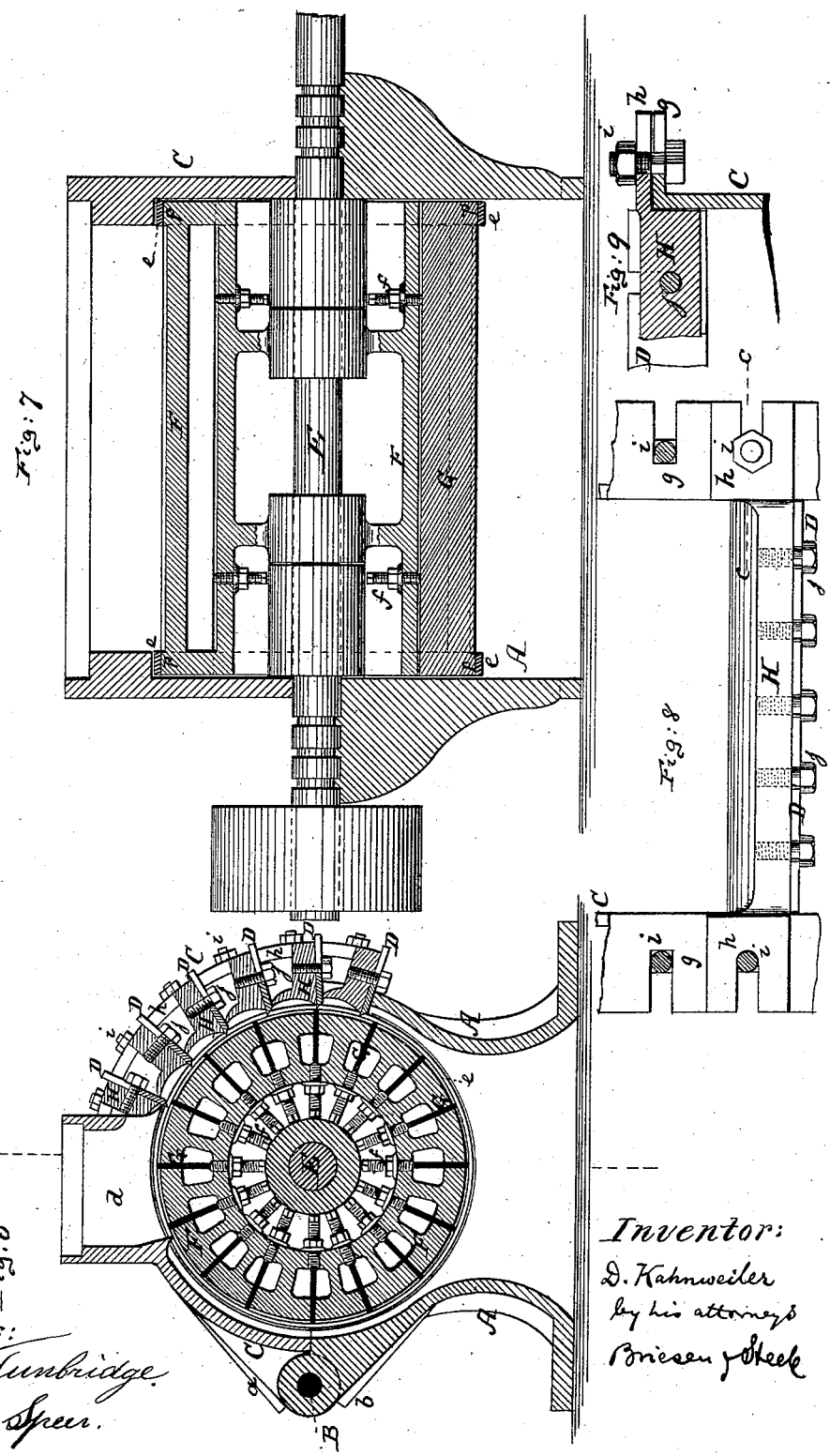

UNITED STATES PATENT OFFICE.

DAVID KAHNWEILER, OF NEW YORK, N. Y.

COTTON-SEED-HULLING MACHINE.

SPECIFICATION forming part of Letters Patent No. 294,241, dated February 26, 1884.

Application filed November 12, 1883. (No model.)

*To all whom it may concern:*

Be it known that I, DAVID KAHNWEILER, a resident of New York city, in the county and State of New York, have invented an Improved Cotton-Seed-Hulling Machine, of which the following is a full, clear, and exact description, reference being made to the accompanying drawings, in which—

Figure 1 is a side elevation of my improved cotton-seed-hulling machine. Fig. 2 is an enlarged face view, and Fig. 3 an edge view, of one of the knives in the concave or lid of the machine. Fig. 4 is an enlarged back view of part of the machine, showing the manner of hinging the concave or lid to the lower part of the frame. Fig. 5 is an enlarged end view of part of the cylinder which is used in the machine. Fig. 6 is a vertical cross-section of the machine; Fig. 7, a vertical longitudinal section of the same; Fig. 8, a top view of one of the ribs carrying the cutters in the concave of the machine; and Fig. 9, a longitudinal section on the plane of the line $c\ c$, Fig. 8.

This invention relates to a new construction of the parts of a cotton-seed huller, whereby the construction and adjustment of the parts of the machine are greatly simplified as compared with machines for the like purpose that were previously in use.

The invention consists in the new details of improvement that are hereinafter more fully pointed out and claimed.

In the drawings, the letter A represents the lower part of the frame of the machine, to which is hinged, by means of a bolt or pin, B, the lid C, the said lid and the said frame being provided with suitable stops, $a\ b$, respectively, so that when the lid is swung open, as indicated by dotted lines in Fig. 1, it will be sustained in the open position by said stops. That part of the lid C which carries the cutters D D is termed the "concave." Near the said concave the lid has a hopper or inlet-opening, $d$, for supplying the machine with the grain that is to be acted upon.

Within the frame A is hung a shaft, E, upon which is mounted the cylinder F, that carries the inner knives, G G. It is not new to make a machine having a cylinder with knives or blades projecting from its periphery, in combination with a concave or outer part having knives to co-operate with the rotating knives of the cylinder, such being the general arrangement of all cotton-seed-hulling machines. My invention has reference to means for more conveniently placing the several knives and adjusting them.

The cylinder F is made substantially hollow, and has end openings or slits, as indicated in Fig. 5, through which the several knives G G can be pushed into place. The outer ends of these several slits are covered by rings $e\ e$, that are driven like the tires of wheels upon the preferably raised ends $p$ of the cylinder, as is more clearly indicated in Fig. 7. These hoops or rings $e\ e$ form the outer supports for the knives G. Against the inner peripheries of the hoops $e$ these knives G G are pressed by set-screws $f f$, that are inserted from the inner side in said hollow cylinder F, as indicated in Figs. 5 and 7. I deem this arrangement of the hoops $e$ on the cylinder to be of great advantage, because it regulates the position of all the knives G G, which the cylinder carries with great exactness, and does away with the skilled service which thus far has been required in setting the several knives all alike, it being, of course, important that all the knives should project at exactly equal distances from the circumference of the cylinder. By arranging the cylinder so that the knives can be pushed in from the end or ends, and so that they will abut against the inner peripheries of the rings or hoops $e$, the attendant has nothing to do but to set the screws $f$ so as to crowd the knives fairly home against said hoops or rings. Another advantage of importance which follows from this construction is that the knives are supported by the said screws $f f$, which can be set as close together as convenient or desirable, and which really sustain the knives near their middle parts, thereby preventing the breaking of the knives when exposed to central strain, which would occur if the knives were simply supported at the ends and not at the center.

The concave, which is that part of the lid C having the knives D D, has outwardly-projecting flanges $g\ g$, on which rest the flattened ends $h$ of the ribs H, to which ribs the knives D are fastened. The flange $g$ and flattened ends $h$ of the ribs H are slotted, as indicated in Figs. 8 and 9, to receive bolts $i$, by which the ribs H are secured in position on the concave, the slots in which the bolts are received being open at their outer ends, so that by slightly loosening the bolts they can be bodily removed, allowing the ribs, with the knives attached thereto, to be lifted out of the machine without inconvenience. Each bolt $i$ should be square, as in Fig. 9, at the part which lies in the slot in the flange $g$, so that the bolt will not turn when the nut on it is revolved to fasten or loosen the rib.

The knives D D, of which one is clearly shown in Fig. 2, have notched upper parts for receiving the screws $j$, by which they are held on the ribs, the notches or slots allowing the ready adjustment of said knives on the ribs. When the knives have been properly set in the concave, the degree of hulling can still be finely regulated by a screw, $m$, which is shown in Fig. 1, and which constitutes a stop for supporting the hinged lid C. By turning this screw up, so as slightly to lift the lid C, a coarser, and by turning it down a finer, cut will be made. Instead of this screw $m$ an equivalent wedge may be employed. The lid is drawn tightly to the place to which the screw $m$ adjusts it by a bolt, $n$, which connects the contiguous flanges of the frame A and lid C, as indicated in Fig. 1. The nut on this bolt $n$ must be loosened before the screw $m$ can be turned up, but is then drawn tight again.

It will be seen that when the lid C is swung back, as shown by dotted lines in Fig. 1, all the knives in the cylinder can be gotten at for removal or repair without requiring the cylinder to be lifted out of the machine.

By setting the hoops $e$ on the raised ends or shoulders $p$ of the cylinder F, I get the gage for the projection of the knives G beyond the cylinder, and can leave the outer edges of the said knives straight, for convenience in grinding.

I claim—

1. The combination of the frame A and hinged lid C with the hollow cylinder F, having end openings, and the knives G, all arranged so that the knives G can be taken out endwise and reinserted when the lid C is swung back, substantially as specified.

2. The combination of the frame A and hinged lid C, carrying knives D, with cylinder F, carrying knives G, and a single adjusting-screw, $m$, for supporting the lid C and regulating the coarseness or fineness of the cut, substantially as specified.

3. The combination of the frame A, the hinged lid C, having knives D, and cylinder F, having knives G, with the supporting and adjusting screw $m$ and holding-bolt $n$, substantially as specified.

4. The combination of the lid C, having slotted flanges $g$, and the ribs H, having slotted end portions, $h$, with the knives D and fastening-bolts $i$ and $j$, substantially as herein shown and described.

DAVID KAHNWEILER.

Witnesses:
HARRY M. TURK,
WILLY G. E. SCHULTZ.